B. A. PETERSON.
DOFFER.
APPLICATION FILED JAN. 6, 1912.
1,122,417.
Patented Dec. 29, 1914.
5 SHEETS—SHEET 1.
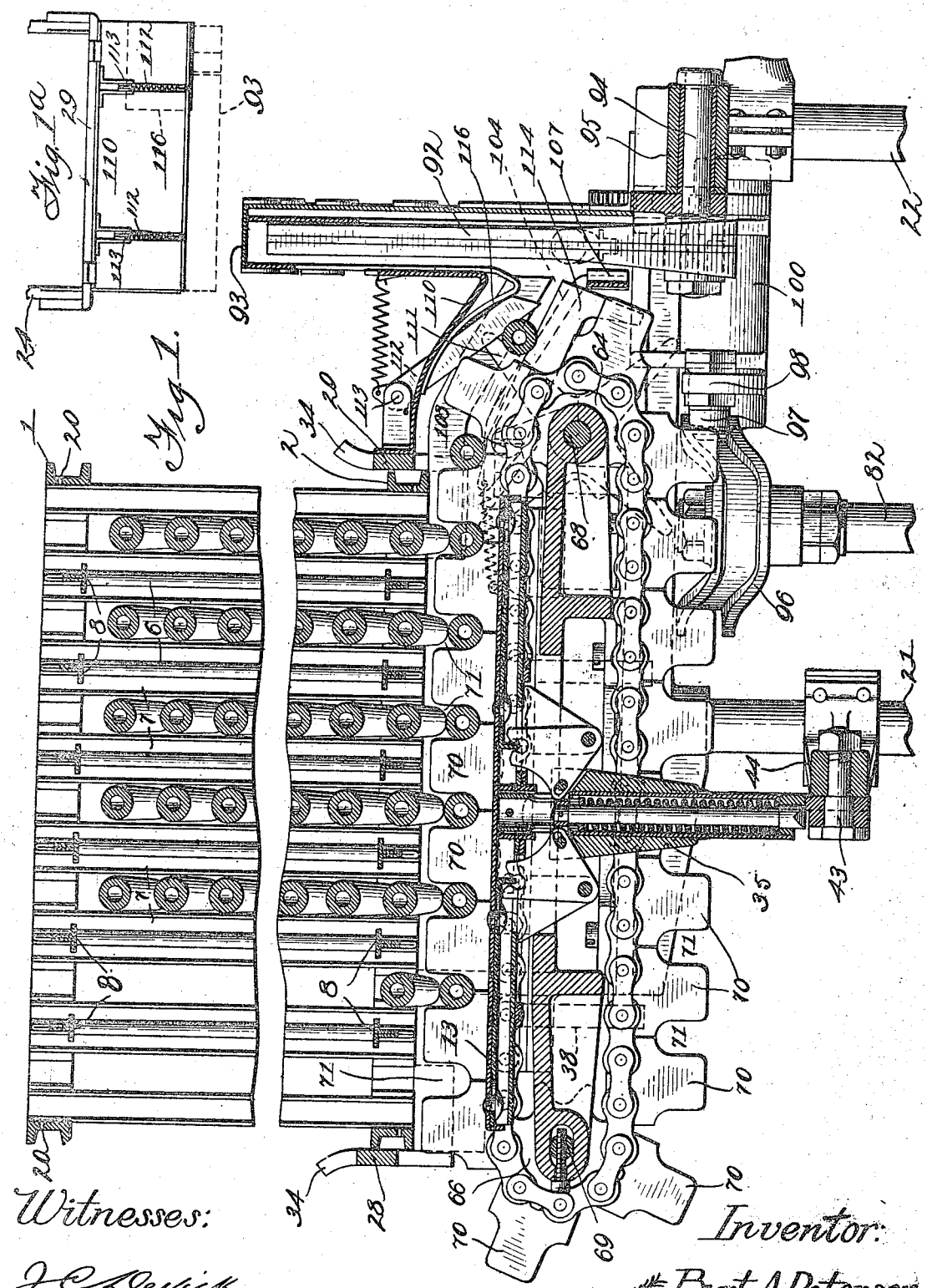
Witnesses:
J. C. Devick.
George L. Chindahl
Inventor:
Burt A. Peterson
By Luther L. Miller
Atty.

B. A. PETERSON.
DOFFER.
APPLICATION FILED JAN. 6, 1912.
1,122,417.
Patented Dec. 29, 1914.
5 SHEETS—SHEET 2.
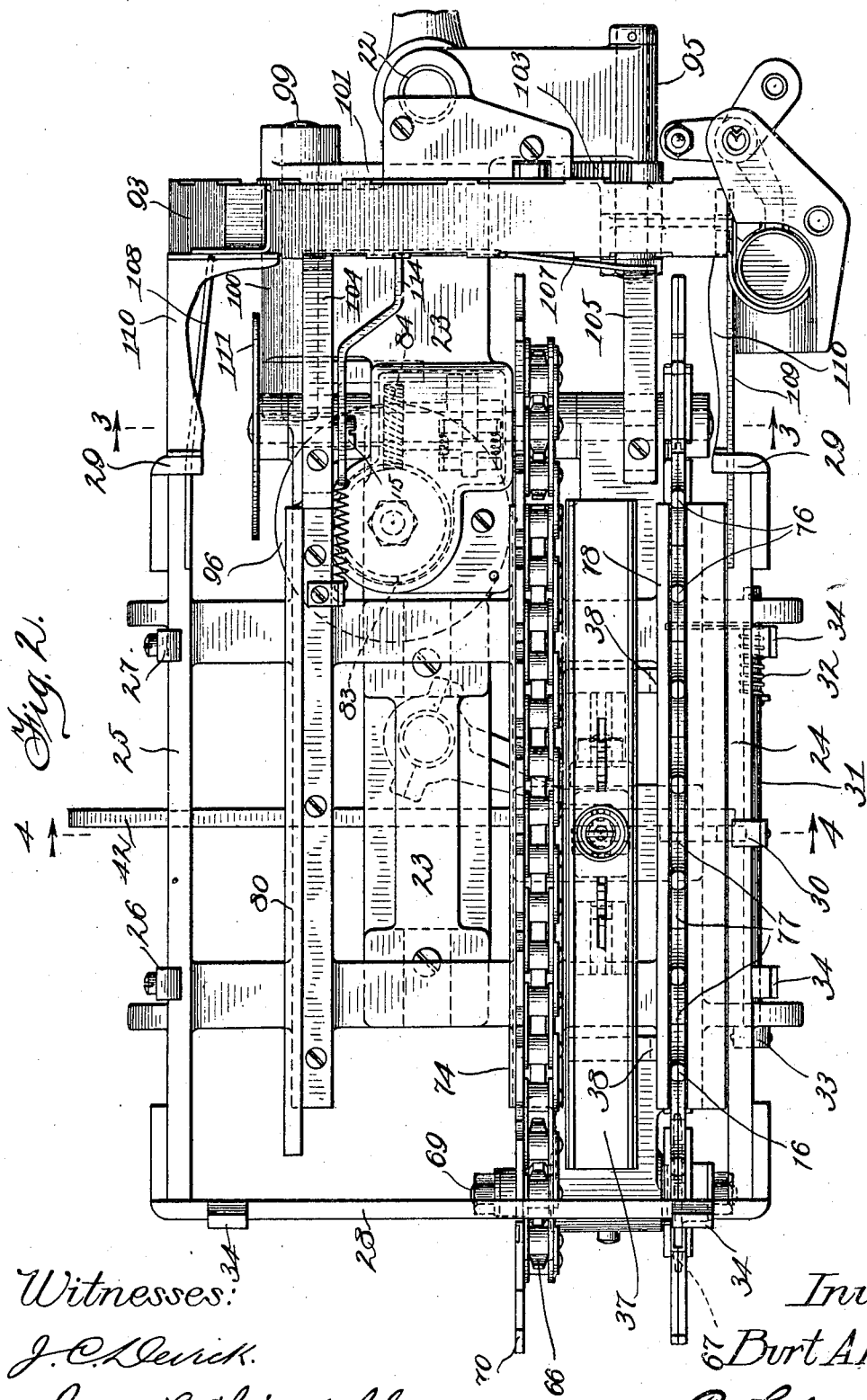
Witnesses:
J. C. Devick.
George L. Chindahl
Inventor:
Burt A. Peterson
By Luther L. Miller
Atty.

B. A. PETERSON.
DOFFER.
APPLICATION FILED JAN. 6, 1912.
1,122,417.
Patented Dec. 29, 1914.
5 SHEETS—SHEET 3.
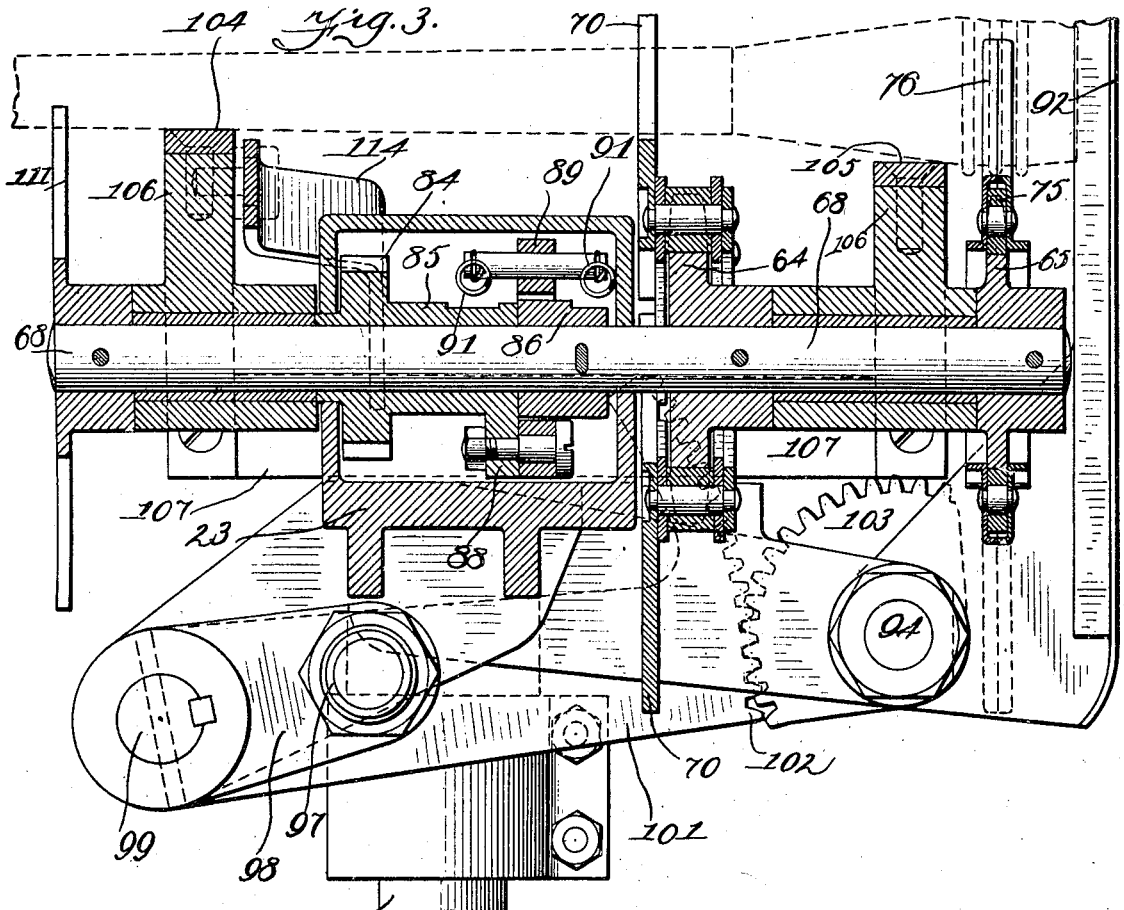
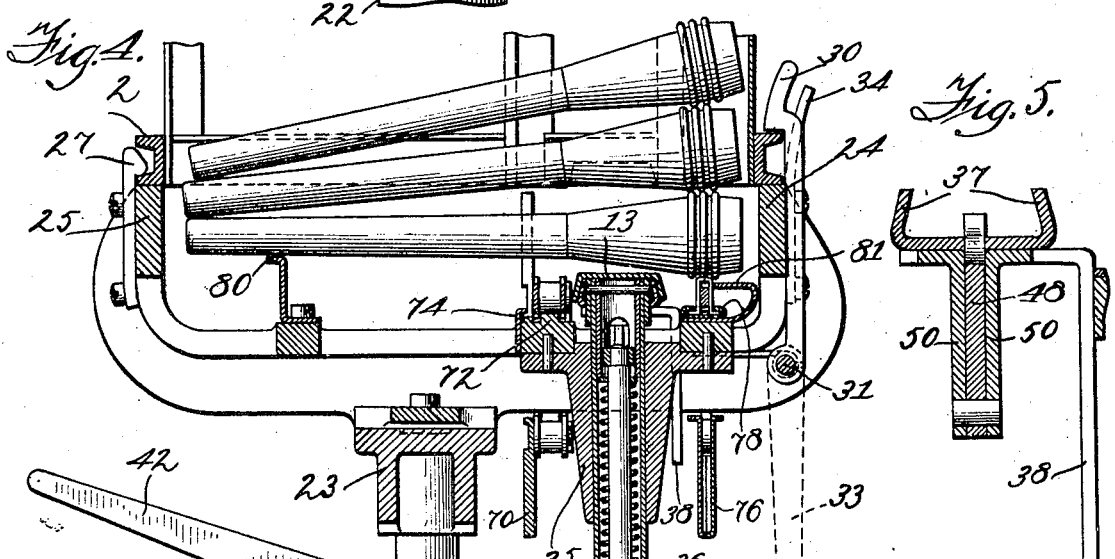
Witnesses:
J. C. Devick.
George L. Chindahl
Inventor:
Burt A. Peterson
By Luther L. Miller
Atty.

B. A. PETERSON.
DOFFER.
APPLICATION FILED JAN. 6, 1912.
1,122,417.
Patented Dec. 29, 1914.
5 SHEETS—SHEET 4.
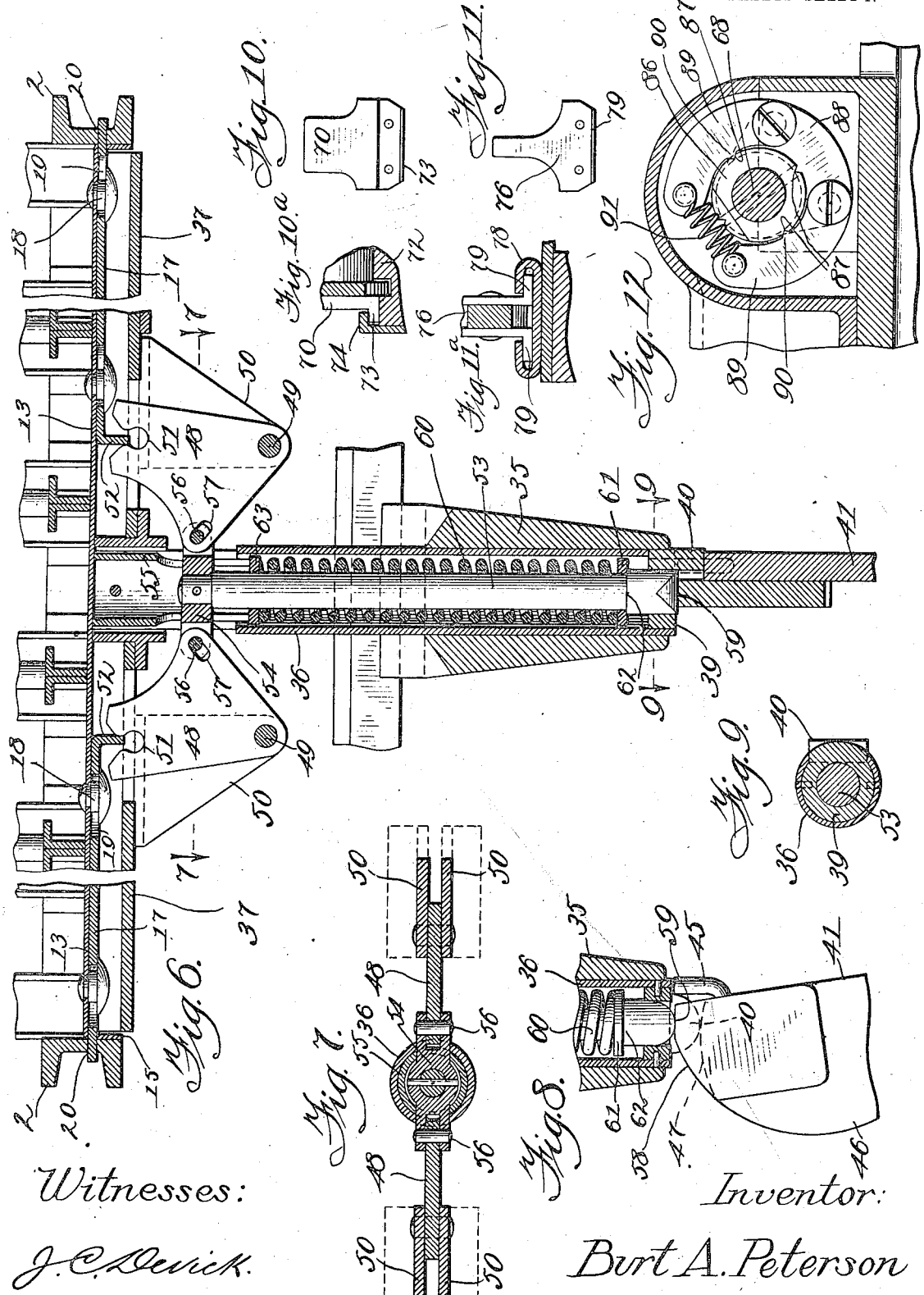
Witnesses:
J. C. Devick
George L. Chindahl
Inventor:
Burt A. Peterson
By Luther L. Miller
Atty.

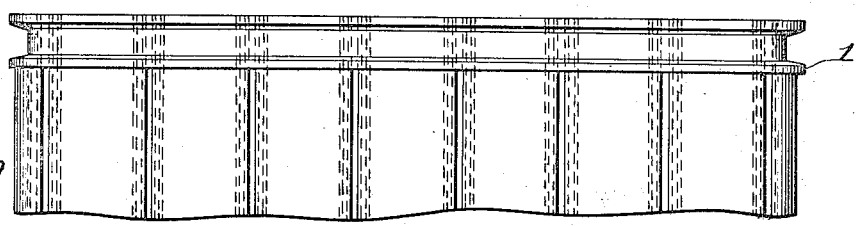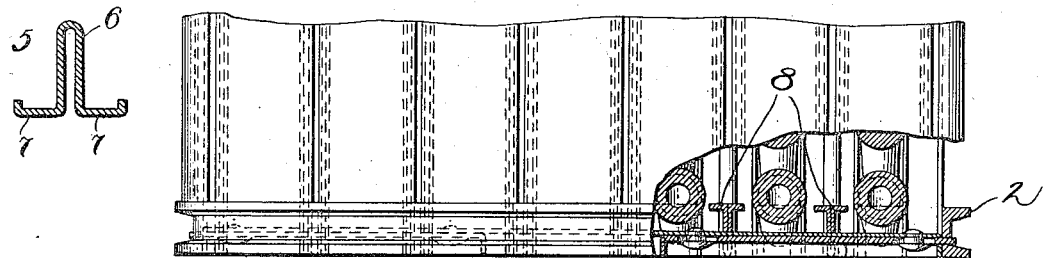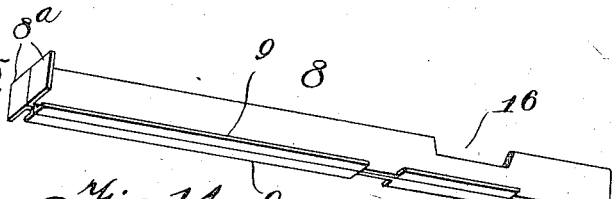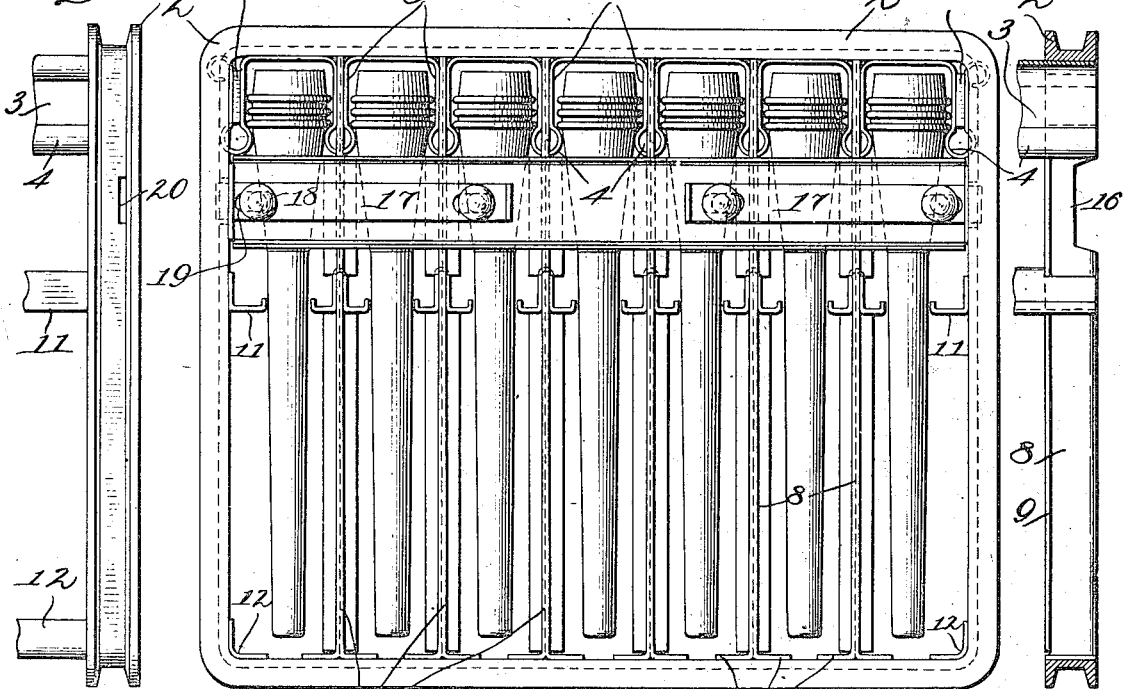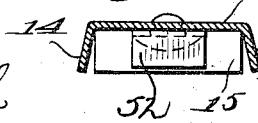

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

DOFFER.

1,122,417.      Specification of Letters Patent.      Patented Dec. 29, 1914.

Application filed January 6, 1912. Serial No. 669,763.

*To all whom it may concern:*

Be it known that I, BURT A. PETERSON, a citizen of the United States, residing at Rockford, in the county of Winnebago and State of Illinois, have invented certain new and useful Improvements in Doffers, of which the following is a specification.

This invention relates to spinning-frame doffers of the type in which the doffer travels along the side of the spinning frame, such a machine being shown in Patent No. 983,858, issued February 7, 1911, on an application filed by Howard D. Colman and Burt A. Peterson.

The present invention relates particularly to the structure of the magazine in which the empty bobbins are contained; to the means for raising, lowering, locking and unlocking the bottom or closure for the magazine; and to the means for feeding bobbins from said magazine.

In the accompanying drawings, Figure 1 is a fragmental vertical sectional view through the upper portion of a doffer embodying the features of my invention. Fig. 1ª is a plan view, on a smaller scale, of certain parts shown in Fig. 1. Fig. 2 is a plan view with parts broken away and with the magazine omitted. Fig. 3 is a vertical section on line 3 3 of Fig. 2, upon an enlarged scale. Fig. 4 is a vertical sectional view taken in the plane of dotted line 4 4 of Fig. 2. Fig. 5 is a transverse section through a support provided in the doffer for the magazine closure, and showing also certain parts attached to said support. Fig. 6 is a fragmental vertical sectional view illustrating the lower part of the magazine and its closure, together with the means for operating the latter. Fig. 7 is a section on line 7 7 of Fig. 6. Fig. 8 illustrates a portion of the means for operating the closure, the parts being shown in the position they occupy when the closure is in its locked position. Fig. 9 is a view through certain parts taken in the plane of line 9 9 of Fig. 6. Figs. 10 and 11 are detail views of lugs comprised in the means for feeding the bobbins. Figs. 10ª and 11ª are sectional views of guide means associated with said feeding means. Fig. 12 illustrates a yielding connection between the bobbin-feeding means and its driving means. Fig. 13 is a fragmental side elevation of the bobbin magazine. Fig. 14 is an under side view of said magazine. Fig. 15 is a detail perspective view of one of the elements composing the magazine. Fig. 16 is a fragmental view of the magazine taken from the left-hand side of Fig. 13. Fig. 17 is a fragmental sectional view of the magazine. Fig. 18 is a transverse section through the magazine closure. Fig. 19 is a transverse section through one of the elements of the magazine.

The embodiment herein shown of my invention is particularly adapted to operate upon weft or filling bobbins. They are herein shown as arranged in a plurality of vertical tiers in the magazine, the butts of all of the bobbins being arranged at the rear side of the magazine. The latter comprises two end frames 1 and 2, and a rear wall formed from a single sheet of metal folded to form partitions 3. The spaces between adjacent partitions extend from one end of the magazine to the other, the width of each such space being but slightly greater than the diameter of the bobbin butt, whereby each space is adapted to contain a vertical tier of butts. In order to limit endwise movement of the bobbins in the magazine and to maintain the butts in substantially vertical alinement, I provide suitable means, as, for example, beads 4 formed upon the inner ends of the partitions, each bead overhanging two adjacent butt spaces.

The tips or bodies of the bobbins are held in vertical alinement by means consisting, in part, of partition-forming elements 5 (Fig. 19), each of which is bent up from sheet metal and which comprises a stiffening web 6 of double thickness, and flanges 7 extending at right angles to said web, the edge portions of said flanges preferably being rounded as indicated in the drawings. The ends of the partition-forming elements 5 are secured to cross-pieces 8, each preferably formed of sheet metal and suitably flanged as at 9, so as to possess the necessary rigidity. The cross-pieces 8 extend from side to side in each end-frame and are flanged at one end (as at 8ª) for attachment to the end-frame. The flanges 9 are cut away at the rear side of the magazine, to accommodate the partitions 3, and the ends of said partitions (with the exception of the outside partitions) are slotted to receive the cross-pieces 8. Within the end folds of the sheet constituting the rear wall of the magazine are filler pieces 10 (Fig. 14). To assist in holding the outer tiers of bobbins in alinement 1 provide flanges 11 extending between the end-frames 1 and 2. The forward corners of the magazine may be strengthened, if desired, by means of angular braces 12 extending between the end frames.

It will be seen that the magazine is constructed entirely of sheet metal, the parts being preferably welded together.

By reason of the location of the partition-forming members 5 and the flanges 11, as shown in the drawings, the forward side of the magazine is entirely open, thus permitting the quantity and arrangement of the bobbins in the magazine to be readily noted.

The lower end of the magazine is closed to the exit of bobbins, by means of a removable closure. Either end of the magazine, however, may be the lower end, the magazine being so constructed that it may be used upon a doffer traveling in a right-hand direction along a spinning frame, or upon a doffer traveling toward the left. The closure consists of a plate 13 having inclined side flanges 14 and right-angular end flanges 15. The closure is arranged to underlie the center of gravity of the bobbins, the cross-pieces 8 at each end of the magazine being cut away, as at 16 (Fig. 17), to accommodate the closure. The latter is arranged to be locked in position by means such as a latch 17 at each end of the closure, each latch being herein shown as mounted for limited sliding movement by means of rivets 18 extending through slots 19 in the latch. The outer ends of the latches are arranged to pass through slots in the flanges 15 and into slots 20 in the end frame of the magazine. Each end-frame is thus slotted, as shown in Fig. 1.

The framework of the doffer may be of any suitable construction. In the form herein shown, the upper portion of the framework consists of two columns 21 and 22, the upper ends of which are rigidly connected by means of a bracket 23. The magazine is supported upon a seat consisting, for example, of two parallel rails 24 and 25 (Figs. 2 and 4) and is held against displacement by suitable means, as, for instance, two rigid hooks 26 and 27, two stop flanges 28 and 29, and a hook 30 fixed upon a shaft 31 journaled in the framework, said hook being normally held in operative position by a torsion spring 32. An arm 33 fast on the shaft 31 provides means for withdrawing the hook 30 from engagement with the magazine.

34 are guides to assist in properly locating the magazine upon the doffer. After the magazine has been positioned upon the doffer, the closure 13 is lowered so as to permit the tiers of bobbins in the magazine to settle upon a bobbin-feeding means located directly below the magazine. The means for unlocking and lowering the closure, and for replacing and again locking the bottom when the magazine is to be removed from the doffer, will now be described.

A tubular guide 35 (Fig. 6) is rigidly fixed in the framework in a vertical position. Within said guide is slidably mounted a tubular stem 36, to the upper end of which is fixed an elongated support 37 for the closure 13. When the closure 13 lies upon the support 37, said closure is held against lateral displacement by means of the flanges 14 and against endwise displacement by the flanges 15. The stem 36 and support 37 are prevented from turning by any suitable means, as, for example, two guide fingers 38 fixed to said support and arranged to slide in contact with a portion of the supporting frame. In the lower end of the tubular stem 36 is fixed a member 39 having a rounded lug 40 thereon. The stem 36 is arranged to be moved upwardly to raise the closure 13 into operative relation to the magazine by means of a cam plate 41 (Fig. 4) fixed with relation to a hand lever 42 pivoted at 43 upon a bracket 44 secured to the column 21, said cam being arranged to operate against the lug 40. Upward swinging movement of the cam plate may be limited in any suitable way, as, for example, by means of a stop 45 fixed to said cam plate in position to contact the lug 40. Upon the cam-plate 41 is a cam surface 46 and a dwell 47.

Each latch 17 is moved into and out of locking position by means comprising a member 48 pivoted at 49 between brackets 50 fixed to the lower side of the support 37. Each member 48 has a notch 51 therein to receive an angular lug 52 upon the inner end of the adjacent latch 17. The members 48 are simultaneously moved upon their pivots to slide the latches 17 in and out by means comprising a rod 53 guided at its lower end within a central opening in the member 39. A cross-head 54 secured to the upper end of said rod is guided in diametrically opposite slots formed in the stem 36 and a tube 55 fitting within and fixed with relation to said stem. The opposite ends of the cross-head 54 are provided with pins 56 which lie within elongated openings 57 in the members 48. It will be seen that said members are in the nature of bell-crank levers and may be moved in unison by moving the rod 53 vertically with relation to the stem 36. Such movement of the rod in an upward direction is caused by a cam 58 fixed to the cam plate 41 in such position as to engage the rod 53 after the cam 46 has ceased to act upon the stem 36. 59 is a dwell at one end of the cam 58. Downward movement of the rod 53 with relation to the stem 36 is caused by a coiled spring 60 bearing at one end against a washer 61, which in turn bears against a shoulder 62 on the rod, the other end of said spring bearing against a washer 63 which rests against the end of the tube 55.

The operation of the closure-operating devices is as follows: Assuming said devices to be in the position indicated in Fig. 6, a magazine is placed upon the doffer and secured in place by means of the hooks 26, 27 and 30. The members 48 stand in proper position to receive the lugs 52 within the recesses 51. The operator then raises the hand lever 42, whereby the dwell 59 and the cam surface 58 are successively withdrawn from beneath the rod 53, thus permitting the spring 60 to push said rod down and swing the members 48 inwardly toward one another, and thereby causing the latches 17 to be withdrawn from the slots 20. By the time the cam surface 58 has passed out from beneath the rod 53, the dwell 47 has moved out from under the lug 40, whereupon the weight of the closure 13, the support 37 and connected parts, together with the weight of the bobbins, causes said closure and support to descend while the cam surface 46 is moving into the position shown in Fig. 4. As indicated in said figure, the weight of the support 37 and connected parts is directly above the axis of the cam 41; therefore the weight of said parts locks the device in the position shown in Fig. 4 against any displacement which might otherwise be caused by vibration of the doffer when in operation. When the closure 13 is to be replaced, the operator swings the hand lever 42 downward, during which movement the cam surface 46 first raises the closure into operative relation to the magazine, and thereafter the cam 58 raises the rod 53 and thereby causes the latches 17 to be projected outwardly into the slots 20. The support 37 is locked in its upper position by reason of the dwell 47 being then directly above the axis 43; and the latch-operating members 48 are locked in the receiving position because of the dwell 59 being vertically alined with said axis.

The bobbin-feeding means consists of a conveyer comprising two chains, each provided with recesses to receive bobbins. In the initial position of the doffer mechanisms, the conveyer chains stand in the position indicated in Figs. 1 and 2, so that as the closure 13 is lowered, the tiers of bobbins settle until the lowermost bobbin in each tier lies within opposite recesses in the two chains. As the conveyer travels, the bobbins thereon are moved under the tiers and discharged at the right-hand side (Fig. 1). The bobbins are exhausted in regular succession, beginning at the side at which the conveyer enters, namely, the left-hand side (referring to Fig. 1). It has been found that as the bobbins are moved under the tiers, the weight of said tiers, acting upon the butts of the bobbins being conveyed, sometimes causes the tips of the bobbins to tilt upwardly. In order to prevent such tilting from causing the tip of the bobbin to leave its recess in the conveyer, I place the tip-conveying chain so close to the butt that the tip cannot become disengaged from said chain.

In the embodiment herein shown, the tip-conveying chain is adapted to engage the bobbin at approximately midway the length of the latter, and the tip-receiving recesses are made relatively deep in order to prevent dislodgment of the bobbins.

The bobbin-conveying chains extend over sprocket wheels 64, 65, 66 and 67 (Figs. 1, 2 and 3). The sprocket wheels 64 and 65 are fixed upon a shaft 68 journaled in the framework, the sprocket wheels 66 and 67 being rotatably mounted upon short shafts 69 adjustably supported to permit of taking up slack in the chains.

The tip-conveying chain may be furnished in any suitable manner with lugs providing between them recesses to receive the bobbin tips. Herein I have shown, by way of example, lugs 70 providing recesses 71 for the tips. The upper run of the tip-conveying chain is supported upon a rail 72 in the supporting frame, and is held against upward displacement by means of flanges 73 on the lugs 70 running beneath an angular guard 74 (Fig. 10ᵃ). The butt-conveying chain may likewise be of any preferred construction, that herein shown consisting of links 75 connecting lugs 76, the latter providing recesses 77 (Fig. 2) between them to receive the bobbin butts. The upper run of the butt-conveying chain is supported in a channel-form guide 78 (Fig. 11ᵃ) secured in the supporting frame, the lugs 76 having angular flanges 79 thereon which coöperate with the guide 78 to prevent upward displacement of the chain.

80 (Fig. 4) is a rail or guard to limit downward movement of the tips of the bobbins; and 81 is a rail or ledge performing a similar function with respect to the butts.

The bobbin conveyer may be driven in any suitable manner, but preferably has a yielding connection with its actuating means. Herein I have shown a vertical shaft 82 (Fig. 1), to the upper end of which is fixed a spiral gear 83 (Fig. 2) which meshes with a similar gear 84 mounted upon the shaft 68. The gear 84 has a yielding clutch connection with said shaft 68, as, for example, that shown in Figs. 3 and 12. As therein indicated, the gear 84 is fast to a sleeve 85 which is rotatable upon the shaft 68. Fixed upon said shaft adjacent to one end of the sleeve 85 is a collar 86 having four equidistant notches 87 in its periphery. The sleeve 85 has a lug 88 thereon to which are pivoted two arms 89 provided with teeth 90 adapted to enter diametrically opposite notches 87 in the collar 86. Resilient means 91 acts upon the free ends of the arms 89 to yieldingly hold the teeth 90 in the notches 87. Should the movement of the conveyer chains be obstructed, the arms 89 will yield to permit slippage between the gear 84 and the shaft 68.

The bobbins discharged in a horizontal position by the conveyer are placed in an upright position, ready to be set upon the spindles of the spinning frame, by means of an erector arm 92 (Figs. 1, 2 and 3) operating within a casing 93 and fixed upon a shaft 94 mounted in a bearing 95 in the bracket 23. The shaft 94 is rocked by the following described means: A cam 96 is fixed upon the shaft 82 and is engaged by a roller stud 97 carried by an arm 98 fixed upon a shaft 99. The latter shaft is mounted in a bearing 100 in the bracket 23. Upon the opposite end of the shaft 99 is fixed an arm 101 provided with a segment 102 which meshes with a segment 103 fixed with relation to the shaft 94.

At the discharge end of the bobbin conveyer is suitable means extending to the erector casing 93 for controlling the movement of the bobbins into said casing. Said means includes two inclined guides 104 and 105 fixed at their upper ends to bosses 106 in the framework, the lower ends of said guides being connected by a bar 107. At opposite sides of the path taken by the bobbins in passing to the erector casing are guard or guide members 108 and 109. Above said path is a cover plate 110. To assist the lugs 70 and 75 in forcing the bobbins down the guides 104 and 105 I provide means arranged in position to engage the bobbins near the outer ends of the tips of the bobbins, as, for example, a star wheel or plurality of radial fingers 111 fixed upon the end of the shaft 68.

The movement of the bobbins down the guides 104 and 105 is controlled by means of two spring-pressed fingers 112 (Figs. 1 and 1ª) pivoted at 113 in position to bear upon the upper sides of the bobbins. Upon the under side of the cover plate 110, and above the path taken by the bobbin tips, is a guide plate 116 to prevent upward displacement of the tips. 114 is a spring-pressed finger pivoted at 115 in position to contact the under sides of the bobbins as the latter pass down the inclines 104 105. The broad free end 114ª of this finger serves to close the space behind the bobbin after the latter has been placed on the erector 92, so that upon the upward movement of the erector the small end of the bobbin shall not catch across the guide or guard 116 or become displaced off the erector. In Fig. 2 most of the cover plate 110 and the fingers 112 are omitted for the sake of clearness. After erection by the arm 92 the bobbins may be directed to and placed upon the spindles by any suitable or well-known means.

I claim as my invention:

1. An empty-bobbin magazine comprising two open end-frames through both of which empty bobbins may be inserted and removed; a plurality of parallel cross-pieces extending across one of said frames; a like number of similar cross-pieces extending across the other frame and parallel with the first mentioned cross-pieces, the space between two adjacent cross-pieces being of proper width and length to receive a single empty bobbin; and partition-forming elements each extending from one of the cross-pieces in one frame to the corresponding cross-piece in the other frame.

2. A bobbin magazine comprising two end-frames; cross-pieces extending from side to side within each frame; means extending between the end-frames and forming one side of the magazine, and also forming butt partitions; and tip-partitioning elements extending from the cross-pieces in one end-frame to the cross-pieces in the other end-frame.

3. A bobbin magazine comprising two end-frames; cross-pieces extending from side to side within each frame; an integral piece of sheet metal folded to form butt partitions and secured at its ends to the end-frames; and tip-partitioning elements extending from the cross-pieces in one end-frame to the cross-pieces in the other end-frame.

4. A bobbin magazine comprising two end-frames; cross-pieces extending from side to side within each frame; sheet metal folded to form butt partitions and secured to the end-frames, said partitions being cut away to receive said cross-pieces; and tip-partitioning elements extending from the cross-pieces in one end-frame to the cross-pieces in the other end-frame.

5. A bobbin magazine comprising two end-frames; cross-pieces extending from side to side within each frame; butt-partition-forming means extending between the end-frames at one side of the magazine, and tip-partitioning elements extending adjacent to the middle of the magazine, and from the cross-pieces in one end-frame to the cross-pieces in the other end-frame.

6. A bobbin magazine comprising two end-frames; cross-pieces extending from side to side within one of said frames; means extending between the end-frames for forming bobbin partitions; and a closure adapted for insertion into the end-frame provided with cross-pieces, said cross-pieces being cut away to receive the closure.

7. The combination of a bobbin magazine having butt-receiving spaces at one side and comprising tip-partitioning elements extending longitudinally of the magazine near the middle thereof; a closure for the magazine; and means securing the closure to one end of the magazine between the butt-receiving spaces and the tip-partitioning elements.

8. In a doffer, a bobbin magazine having a bottom, two latches on the bottom for locking the latter in place, and means on the doffer for operating said latches.

9. In a doffer, a bobbin magazine having a bottom and two bottom-locking latches slidable toward and away from each other, and means on the doffer for operating said latches.

10. In a doffer, a bobbin magazine having a bottom and a bottom-locking means, and a single means on the doffer for vertically moving the bottom and operating said locking means.

11. In a doffer, a doffer framework, a bobbin magazine supported upon the framework and having a bottom and bottom-locking means, a lever pivoted in the framework, and devices operable by the lever for vertically moving the bottom and operating the locking means.

12. In a doffer, a framework, a bobbin magazine supported upon the framework and having a bottom and bottom-locking means, a bottom-support movably mounted in the framework, means carried by said support for operating said locking means, and a single means for moving said support and actuating said lock-operating means.

13. In combination, a framework, a bobbin magazine supported upon the framework, and having a bottom and bottom-locking means, a bottom-support movably mounted in the framework, means carried by said support for operating said locking means, a hand lever mounted in the framework, and means connected to said hand lever for moving said support and actuating said lock-operating means.

14. In combination, a framework, a bobbin magazine supported upon the framework, and having a bottom and bottom-locking means, a bottom support having a stem which is guided in the framework for vertical movement, means carried by said support for operating said locking means, a hand lever mounted in the framework, a cam movable by said lever into and out of position beneath said stem, and means moving with said cam for actuating said lock-operating means.

15. In combination, a framework, a bobbin magazine supported upon the framework, and having a bottom and bottom-locking means, a bottom support having a stem which is guided in the framework for vertical movement, means carried by said support for operating said locking means, a hand lever pivoted in the framework, a cam plate attached to said lever and adapted to be swung into and out of position beneath said stem, and a cam member fixed to said cam plate and adapted to actuate said lock-operating means.

16. In combination, a framework, a bobbin magazine supported upon the framework and having a bottom, a latch mounted on the bottom for locking the latter to the magazine, a bottom support movably mounted in the framework, and spring-actuated means carried by said support for moving said latch into its inoperative position.

17. In combination, a framework, a bobbin magazine supported upon the framework and having a bottom, a latch on the bottom for locking the latter to the magazine, a bottom support movably mounted in the framework, a member pivoted on said support and adapted to engage said latch, spring-actuated means for moving said member to unlock the latch, and means for vertically moving said support and restoring said spring-actuated means.

18. In combination, a framework, a bobbin magazine supported upon the framework, and having a bottom, a latch on the bottom for locking the latter to the magazine, a bottom support having a stem which is guided in the framework for vertical movement, a member pivoted upon the bottom support and adapted to engage the latch, a rod mounted within said stem and connected at its upper end to said member, a spring tending to move said rod downward with relation to the stem, and means for vertically moving said stem and for moving said rod upward with relation to the stem.

19. In combination, a bobbin magazine, a bottom for the magazine, bottom locking means, and a single means for vertically moving the bottom and operating said locking means.

20. In a doffer, a bobbin magazine, a bobbin-conveyer forming a bottom for said magazine, said conveyer comprising a butt-conveying chain and another chain engaging the bobbins relatively close to the butts, suitably supported sprocket wheels for the receiving end of the conveyer, a shaft provided with sprocket wheels for the discharge end of said conveyer, a star wheel fixed on said shaft in position to engage the tips of the bobbins, and means for rotating said shaft.

21. The combination of a bobbin magazine, a bottom for the magazine, two bottom locking latches slidable toward and away from each other, and means for sliding the latches into and out of locking position.

22. The combination of a framework, a bobbin magazine supported upon the framework, a bottom for the magazine, bottom locking means, a hand-lever pivoted in the framework, and a device operable by the lever for operating the locking means.

23. The combination of a framework, a bobbin magazine supported upon the framework, a bottom for the magazine, bottom locking means, a bottom support movably mounted in the framework, means carried by said support for operating said locking means, and a single manually-operable means for moving said support and actuating said lock-operating means.

24. The combination of a bobbin magazine, a bottom for the magazine, a latch on the bottom for locking the bottom in place, a pivoted member engaging said latch, a rod connected to said member for swinging the latter, a spring tending to move the rod in one direction, and manually-operable means for moving said rod in the opposite direction.

In testimony whereof I hereunto affix my signature in the presence of two witnesses.

BURT A. PETERSON.

Witnesses:
W. C. R. HEYM,
LOUISE A. CULVER.